3,170,930
DERIVATIVES OF DIBENZO[1,4,5]THIADIAZEPINE, DIBENZO[1,4,5]OXADIAZEPINE AND DIBENZO-[1,2,5]TRIAZEPINE
Harman S. Lowrie, Northbrook, Ill., assignor to G. D. Searle & Co., Chicago, Ill., a corporation of Delaware
No Drawing. Filed Mar. 23, 1961, Ser. No. 97,738
7 Claims. (Cl. 260—310)

This invention relates to a novel group of compounds which are derivatives of dibenzo[1,4,5]thiadiazepine, dibenzo[1,4,5]oxadiazepine and dibenzo[1,2,5]triazepine. More specifically, the compounds of this invention can be represented by the following general formula

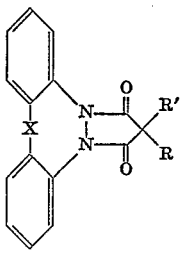

wherein X represents a member of the group consisting of R"N<, —O—, —S—, >SO and >SO$_2$; R represents a member of the group consisting of hydrogen, lower alkyl, phenyl, and phenyl(lower alkyl); R' is a member of the group consisting of hydrogen and lower alkyl; and R" is lower alkyl. The lower alkyl radicals contain less than 7 carbon atoms. Typically, R can be hydrogen, methyl, ethyl, propyl, butyl, sec-butyl, pentyl, phenyl, benzyl, or β-phenylethyl while R' can be hydrogen, methyl, ethyl, or butyl.

The compounds of this invention possess useful antiinflammatory activity. More particularly, they have a phenylbutazone-like effect on edematous conditions. Safety and effectiveness in human beings has not been established at this time.

Preparation of the claimed compounds is accompanied by condensing an appropriate starting material of the formula

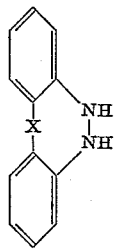

with a malonyl dihalide at a temperature of 0 to —40° C. in the presence of a strong organic base. Especially suitable are such tertiary amines as pyridine, alkylated pyridines or trialkylamines. An aromatic hydrocarbon or a halogenated hydrocarbon such as methylene chloride or chloroform is a convenient inert organic solvent suitable for the reaction.

The intermediate hydrazo compounds described above can be prepared from a dinitro compound of the formula

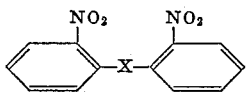

wherein X is defined as above. In a typical procedure, 50 parts of barium hydroxide octahydrate in 400 parts of hot water is added to 0.1 mole of the above dinitro compound in 1580 parts of hot ethanol. The mixture is refluxed and 44 parts of zinc dust is added portionwise. After being refluxed for an additional 30 minutes, the mixture is filtered and the solid is washed with hot ethanol. Thirty parts of mercuric oxide is added to the combined filtrates and the warm mixture is stirred for 30 minutes before it is saturated with carbon dioxide. After the addition of infusorial earth, the mixture is filtered and the solvent is removed from the filtrate while the temperature is not allowed to rise above 50° C. The residue is dissolved in 2130 parts of ether, and the resultant solution is washed first with dilute potassium hydroxide and then with water before it is dried over potassium carbonate and concentrated. On cooling, there precipitates an azo compound having the following general formula

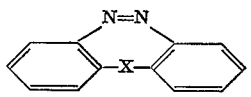

A mixture is prepared from 0.00175 mole of the above azo compound and 0.5 part of hydrazine in 142 parts of boiling ether and 0.02 part of platinum oxide is added portionwise to the hot solution. Heating is continued until a colorless solution is obtained and ether is added to maintain the volume of the solution. When the reaction is complete, the mixture is concentrated under nitrogen to incipient precipitation of the dissolved solid before it is cooled and filtered to give the substituted hydrazine. The following compounds are obtained in this way:

5,6-dihydrodibenzo[1,4,5]thiadiazepine-11-oxide melting at about 182–183° C.

5,6 - dihydrodibenzo[1,4,5]thiadiazepine melting at about 102–103° C.

5,6 - dihydrodibenzo[1,4,5]thiadiazepine-11,11-dioxide melting at about 195–197° C.

5,6 - dihydrodibenzo[1,4,5]oxadiazepine melting at about 98.5–99° C.

11-methyl-5,6-dihydrodibenzo[1,2,5]triazepine melting at about 96–97° C.

The following examples describe in detail certain of the compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted.

*Example 1*

To 3.9 parts of pyridine in 268 parts of methylene chloride is added at —40° under a nitrogen atmosphere with stirring 2.6 parts of methylmalonyl dichloride and then a solution of 3.1 parts of 5,6-dihydrodibenzo[1,4,5]thiadiazepine in 134 parts of methylene chloride. After standing overnight at 0° C. the solution is washed with dilute hydrochloric acid and dried over anhydrous sodium sulfate. The methylene chloride is evaporated under reduced pressure with gentle heating so that the temperature does not rise above 40° C. The residual material is taken up in ether-dilute potassium hydroxide and the ether layer is extracted with dilute potassium hydroxide. The aqueous layers are combined, stirred with activated charcoal, filtered and acidified with dilute hydrochloric acid. After extracting the resultant suspension with ether, the ether layer is dried, concentrated, and cooled. This gives 2- methyl - 1,3 - dioxo - 2,3,3a,12b - tetrahydro-1H-dibenzo-[b,f]pyrazolo[1,2-d][1,4,5]thiadiazepine melting at about 238–240° C. It has the following formula

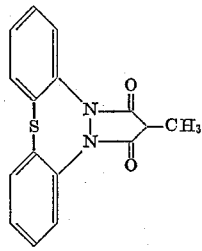

Example 2

At a temperature of −40° C. under a nitrogen atmosphere, 2.7 parts of ethylmalonyl dichloride is added to 3.9 parts of pyridine in 268 parts of methylene chloride with stirring. This is followed by the addition of a solution of 3.0 parts of 5,6-dihydrodibenzo[1,4,5]thiadiazepine in 268 parts of methylene chloride. After standing overnight at 0° C. the solution is washed with dilute hydrochloric acid and dried over anhydrous sodium sulfate and the methylene chloride is evaporated under reduced pressure. Treatment of the residue with ether-dilute potassium hydroxide is followed by extraction of the ether layer with dilute potassium hydroxide. The combined aqeous layers are acidified and extracted with ether. The ether layer is dried, concentrated, and cooled to yield 2 - ethyl-1,3-dioxo-2,3,3a,12b-tetrahydro-1H-dibenzo[b,f]pyrazolo[1,2-d][1,4,5]thiadiazepine melting at about 141–142° C.

Example 3

A solution of 4.7 parts of pyridine and 268 parts of methylene chloride is cooled in an acetone-Dry Ice bath under nitrogen and 5.3 parts of diethylmalonyl dichloride is added at −40° C. Subsequently, 5.4 parts of 5,6-dihydrodibenzo[1,4,5]thiadiazepine in 134 parts of methylene chloride is added. The mixture is allowed to stand overnight at 0° C. before it is washed with dilute hydrochloric acid and dried over sodium sulfate. The solvent is removed under reduced pressure and the residue is recrystallized from benzene to give 2,2-diethyl-1,3-dioxo-2,3,3a,12b - tetrahydro - 1H - dibenzo[b,f]pyrazolo[1,2-d][1,4,5]thiadiazepine.

If an equivalent quantity of dibutylmalonyl dichloride is substituted for the diethylmalonyl dichloride in the above procedure, the product is 2,2-dibutyl-1,3-dioxo-2,3,3a,12b - tetrahydro - 1H - dibenzo[b,f]pyrazolo[1,2-d][1,4,5]thiadiazepine.

Example 4

To 4.7 parts of pyridine in 268 parts of methylene chloride, 5.3 parts of butylmalonyl dichloride is added at −40° under a nitrogen atmosphere with stirring. This is followed by a solution of 5.4 parts of 5,6-dihydrodibenzo-[1,4,5]thiadiazepine in 134 parts of methylene chloride. The solution is allowed to stand overnight at 0° C. before it is washed with dilute hydrochloric acid and dried. The solvent is removed under reduced pressure and the residue is treated with ether and dilute potassium hydroxide. The ether is extracted with another portion of dilute potassium hydroxide and the combined aqueous layers are treated with charcoal and acidified with dilute hydrochloric acid. The suspension is extracted with ether and the ether layer is dried, concentrated, and cooled to yield 2-butyl-1,3-dioxo - 2,3,3a,12b - tetrahydro-1H-dibenzo[b,f]pyrazolo[1,2-d][1,4,5]thiadiazepine melting at about 199–200° C.

Example 5

First, 3.4 parts of sec-butylmalonyl dichloride and subsequently 3.1 parts of 5,6-dihydrodibenzo[1,4,5]thiadiazepine in 134 parts of methylene chloride is added to 3.9 parts of pyridine in 268 parts of ethylene chloride with stirring at −40° C. under a nitrogen atmosphere. The solution is allowed to stand overnight at 0° C. It is washed with dilute hydrochloric acid, dried over anhydrous sodium sulfate and the methylene chloride is evaporated under reduced pressure. The residue is treated with ether and extracted with 2 portions of dilute potassium hydroxide. After acidification of the combined aqueous layers with dilute hydrochloric acid, the resultant mixture is extracted with ether and the ether solution is dried, concentrated, and cooled to yield 2-(1-methylpropyl)-1,3-dioxo-2,3,3a,12b - tetrahydro - 1H-dibenzo[b,f]pyrazolo[1,2-d][1,4,5]thiadiazepine melting at about 152–153.5° C.

Example 6

At a temperature of −40° C. under a nitrogen atmosphere, 3.6 parts of pentylmalonyl dichloride is added to a solution of 2.9 parts of pyridine in 268 parts of methylene chloride with stirring. This is followed by the addition of 3.1 parts of 5,6-dihydrodibenzo[1,4,5]thiadiazepine in 134 parts of methylene chloride. After standing overnight at 0° C. the solution is washed with dilute hydrochloric acid and dried over anhydrous sodium sulfate. The solvent is evaporated under reduced pressure and the residue is taken up in ether-dilute potassium hydroxide. After extraction of the ether layer with dilute potassium hydroxide solution, the aqueous layers are combined, treated with charcoal and acidified. The acidified solution is extracted with ether and the ether solution is dried, concentrated and cooled. This yields 2-pentyl - 1,3 - dioxo-2,3,3a,12b-tetrahydro-1H-dibenzo[b,f]pyrazolo[1,2-d][1,4,5]thiadiazepine melting at about 188–190° C.

Example 7

A solution of 7.8 parts of pyridine in 402 parts of methylene chloride is cooled in an acetone-Dry Ice bath under a nitrogen atmosphere and 5.4 parts of phenylmalonyl dichloride is added at −40° C. with stirring. Subsequently, 4.2 parts of 5,6-dihydrodibenzo[1,4,5]thiadiazepine in 201 parts of methylene chloride is added. After standing overnight at 0° C. the mixture is washed with dilute hydrochloric acid and dried over anhydrous sodium sulfate. The methylene chloride is evaporated under reduced pressure and the residual material is recrystallized from benzene to yield 2-phenyl-1,3-dioxo-2,3,3a,12b - tetrahydro - 1H-dibenzo[b,f]pyrazolo[1,2-d][1,4,5]thiadiazepine. This product has the following formula

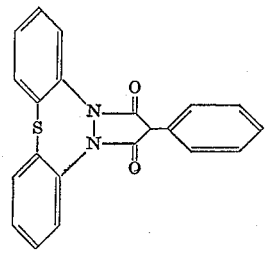

Example 8

A solution of 3.9 parts of pyridine in 268 parts of methylene chloride is cooled in an acetone-Dry Ice bath under nitrogen and 3.9 parts of β-(phenylethyl)malonyl dichloride is added at −40° C. with stirring. Subsequently, a solution of 3.0 parts of 5,6-dihydrodibenzo[1,4,5]thiadiazepine in 268 parts of methylene chloride is added. The solution is allowed to stand overnight at 0° C. It is washed with dilute acid and dried and the solvent is evaporated under reduced pressure. The residue is recrystallized from methanol to give 2-(β-phenylethyl)-1,3-dioxo - 2,3,3a,12b - tetrahydro - 1H-dibenzo[b,f]pyrazolo[1,2-d][1,4,5]thiadiazepine melting at about 205–207° C.

Example 9

First, 2.5 parts of butylmalonyl dichloride and subsequently 2.4 parts of 5,6-dihydrodibenzo[1,4,5]oxadiazepine in 134 parts of methylene chloride is added to 4.9 parts of pyridine in 268 parts of methylene chloride at —40° C. under a nitrogen atmosphere with stirring. After standing overnight at 0° C., the mixture is washed with dilute hydrochloric acid and dried and the solvent is removed under reduced pressure. The residue is treated with ether and dilute potassium hydroxide and the ether layer is extracted with dilute base. The aqueous layers are combined and treated with charcoal before acidification with dilute hydrochloric acid. The resultant suspension is extracted with ether and the ether layer is dried, concentrated and cooled to give 2-butyl-1,3-dioxo-2,3,3a, 12b - tetrahydro - 1H - dibenzo[b,f]pyrazolo[1,2-d][1,4,5]oxadiazepine melting at about 129–130° C. and having the formula

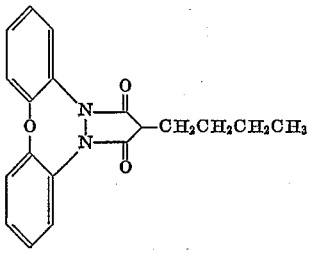

Example 10

To 3.9 parts of pyridine in 268 parts of methylene chloride is added at —40° under a nitrogen atmosphere with stirring first 4.8 parts of benzylmalonyl dichloride and subsequently a solution of 4.0 parts of 5,6-dihydrodibenzo[1,4,5]oxadiazepine in 134 parts of methylene chloride. The solution is allowed to stand overnight at 0° C. before it is washed with dilute hydrochloric acid and dried. The methylene chloride is evaporated under reduced pressure while the temperature is kept below 40° C. The residue is recrystallized from methanol to yield 2-benzyl-1,3-dioxo-2,3,3a,12b - tetrahydro - 1H - dibenzo[b,f]pyrazolo[1,2-d][1,4,5]oxadiazepine.

Example 11

To 7.8 parts of pyridine in 402 parts of methylene chloride is added at —40° under a nitrogen atmosphere with stirring, first, 5.4 parts of phenylmalonyl dichloride and subsequently a solution of 4.6 parts of 5,6-dihydrodibenzo[1,4,5]thiadiazepine-11-oxide in 201 parts of the methylene chloride. The solution is allowed to stand overnight at 0° C. before it is washed with dilute hydrochloric acid and dried over anhydrous sodium sulfate. After evaporation of the solvent under reduced pressure, the residue is recrystallizing from benzene to yield 2-phenyl-1,3-dioxo-2,3,3a,12b-tetrahydro - 1H - dibenzo[b,f]pyrazolo[1,2-d][1,4,5]thiadiazepine - 8 - oxide which has the following formula

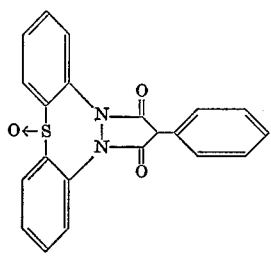

Example 12

At a temperature of —40° C. under a nitrogen atmosphere, 2.7 parts of dimethylmalonyl dichloride is added to a solution of 3.9 parts of pyridine in 268 parts of methylene chloride with stirring. This is followed by the addition of 3.6 parts of 5,6-dihydrodibenzo[1,4,5]-thiadiazepine-11,11-dioxide in 268 parts of methylene chloride. After the solution is allowed to stand overnight at 0° C., it is washed with dilute hydrochloric acid and dried over anhydrous sodium sulfate. The methylene chloride is evaporated under reduced pressure while the temperature is not permitted to rise above 40° C. The residue is recrystallized from ether to give 2,2-dimethyl-1,3-dioxo-2,3,3a,12b-tetrahydro - 1H - dibenzo[b,f]pyrazolo-[1,2-d][1,4,5]thiadiazepine-8,8-dioxide having the following formula

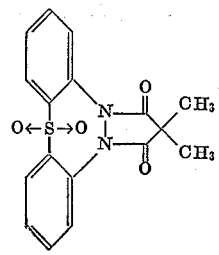

Example 13

A solution of 3.9 parts of pyridine in 268 parts of methylene chloride is cooled in an acetone-Dry Ice bath under nitrogen and 4.8 parts of benzylmalonyl dichloride is added at —40° C. with stirring. Subsequently, a solution of 5.1 parts of 5,6-dihydrodibenzo[1,4,5]thiadiazepine-11,11-dioxide in 134 parts of methylene chloride is added. The solution is allowed to stand overnight at 0° C. It is washed with dilute acid and dried and the solvent is evaporated under reduced pressure. The residue is recrystallized from methanol to give 2-benzyl-1,3-dioxo-2,3,3a,12b - tetrahydro - 1H - dibenzo[b,f]pyrazolo-[1,2-d][1,4,5]thiadiazepine-8,8-dioxide.

Example 14

To 4.9 parts of pyridine in 400 parts of methylene chloride, 4.2 parts of butylmalonyl dichloride is added at —40° C. under a nitrogen atmosphere with stirring. This is followed by a solution of 4.0 parts of 11-methyl-5,6-dihydrodibenzo[1,2,5]triazepine in 135 parts of methylene chloride. The solution is allowed to stand overnight at 0° C. before it is washed with dilute hydrochloric acid and dried. The solvent is removed under reduced pressure and the residue is treated with ether and dilute potassium hydroxide. The ether is extracted with another portion of dilute potassium hydroxide and the combined aqueous layers are treated with charcoal and acidified with dilute hydrochloric acid. The suspension is extracted with ether and the ether layer is dried, concentrated, and cooled to yield 2-butyl-8-methyl-1,3-dioxo-1,2,3,3a,8,12b-hexahydrodibenzo[c,f]pyrazolo[1,2 - a][1,2,3]triazepine melting at about 165–168° C .

What is claimed is:
1. A compound of the formula

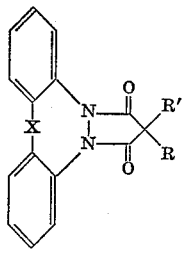

wherein X represents a member of the group consisting of R''N<, —O—, —S—, >SO, and >SO₂; R represents a member of the group consisting of hydrogen, lower alkyl, phenyl, and phenyl(lower alkyl); and R' is a member of the group consisting of hydrogen and lower alkyl; R'' is lower alkyl.

2. A compound of the formula

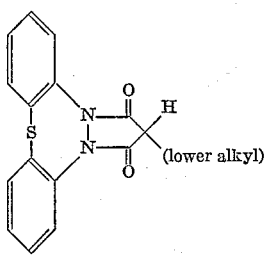

3. 2-ethyl-1,3-dioxo-2,3,3a,12b-tetrahydro-1H-dibenzo-[b,f]pyrazolo[1,2-d][1,4,5]thiadiazepine.
4. 2-butyl-1,3-dioxo-2,3,3a,12b-tetrahydro-1H-dibenzo-[b,f]pyrazolo[1,2-d][1,4,5]thiadiazepine.
5. 2-butyl-1,3-dioxo-2,3,3a,12b-tetrahydro-1H-dibenzo-[b,f]pyrazolo[1,2-d][1,4,5]oxadiazepine.
6. 2-butyl-8-methyl-1,3-dioxo-1,2,3,3a,8,12b-hexahydrodibenzo[c,f]pyrazolo[1,2-a][1,2,5]triazepine.
7. The process for preparing a compound of the formula

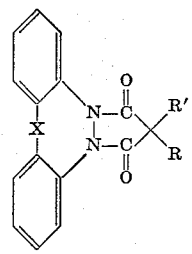

wherein X represents a member of the group consisting of R''N<, —O—, —S—, >SO, and >SO$_2$; R represents a member of the group consisting of hydrogen, lower alkyl, phenyl, and phenyl(lower alkyl); and R' is a member of the group consisting of hydrogen and lower alkyl; and R'' is lower alkyl which comprises mixing a compound of the formula

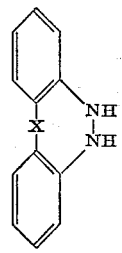

with at least one equivalent of a malonyl halide in the presence of a strong organic base.

References Cited in the file of this patent
UNITED STATES PATENTS

| | | |
|---|---|---|
| 2,281,583 | Kranzlein | May 5, 1942 |
| 2,461,038 | Cusic | Feb. 8, 1949 |

FOREIGN PATENTS

| | | |
|---|---|---|
| 646,597 | Great Britain | Nov. 22, 1950 |
| 1,162,118 | France | Apr. 8, 1958 |
| 1,163,358 | France | Apr. 28, 1958 |